United States Patent [19]

Greig et al.

[11] Patent Number: 4,874,627

[45] Date of Patent: Oct. 17, 1989

[54] NON-FAT DAIRY COMPOSITIONS

[75] Inventors: Donald G. Greig, Petaluma; Edward L. Bonneau, III, Mill Valley, both of Calif.

[73] Assignee: Nouevelle Ice Cream Corporation, San Rafael, Calif.

[21] Appl. No.: 206,616

[22] Filed: Jun. 14, 1988

[51] Int. Cl.$^4$ .......................... A23G 3/32; A23G 3/30; A23G 9/02

[52] U.S. Cl. ...................................... 426/565; 426/579; 426/584; 426/658; 426/660; 426/804

[58] Field of Search ............... 426/565, 566, 567, 579, 426/584, 588, 658, 660, 804

[56] References Cited

U.S. PATENT DOCUMENTS

| | | | |
|---|---|---|---|
| 3,128,193 | 4/1964 | Hilker | 426/565 |
| 3,928,649 | 12/1975 | Cobb | 426/565 |
| 4,272,299 | 6/1981 | Bush | 426/654 |
| 4,282,262 | 8/1981 | Blake | 426/573 |
| 4,631,196 | 12/1986 | Zeller | 426/565 |
| 4,722,851 | 2/1988 | Kadan et al. | 426/573 |

*Primary Examiner*—Jeanette Hunter
*Attorney, Agent, or Firm*—McCubbrey, Bartels, Meyer & Ward

[57] ABSTRACT

The present invention discloses non-fat dairy dessert compositions, which in a preferred form consist essentially of non-fat milk, sweetener, water and stabilizer, wherein at least a portion of the milk sugars and milk solids from the non-fat milk have been caramelized. When frozen, the non-fat dairy dessert compositions of the present invention have body, texture and flavor characteristic of a good quality fat-containing ice cream.

15 Claims, No Drawings

NON-FAT DAIRY COMPOSITIONS

FIELD OF THE INVENTION

The present invention relates to non-fat dairy compositions and to a process for the manufacture thereof. The non-fat dairy compositions of the present invention can be frozen to make non-fat dairy desserts that have the body, flavor and texture of good quality ice creams.

BACKGROUND ART

Because of an increasing awareness that high fat dietary intake can be harmful to health, attempts have been made to produce food products that are low in fat. Most of these attempts have been less than satisfactory, especially when it comes to low fat foods that are meant to "mimic" their high fat counterparts. Such has been the case with ice cream.

A noted ice cream authority (W. S. Arbuckle, in *Ice Cream*, Fourth Edition, 1986, AVI Publishing Company, Westport, CT at page 39) describes ice cream as a complex oil-in-water type of emulsion in which the dispersed phase is the milk fat, and the continuous phase is aqueous serum consisting of calcium caseinate-calcium phosphate micelles, serum proteins, carbohydrates and mineral salts. Despite its complexity, when properly prepared and handled, this oil-in-water emulsion can withstand the stress of freezing without losing its characteristic smoothness, body and flavor. Unfortunately, the same has not been true for most prior art low fat frozen deserts meant to "mimic" ice cream. In these products, either because it is difficult to freeze them or to retain their composition at the freezing temperature, a low fat content has usually meant a decrease or loss of desired ice cream characteristics, namely, smoothness, body and flavor.

Of the various known low fat frozen desserts, frozen yogurt is perhaps the most successufl when it comes to mimicking the desired characteristics of ice cream. Like ice cream, frozen yogurt is smooth and has an acceptable body. If additional sugar or sweetener is added to the yogurt, most consumers also feel that frozen yogurt has an acceptable tart flavor as well.

Despite these apparent similarities and many common ingredients, ice cream and cultured frozen yogurt are really quite different products. While both ice cream and yogurt begin with a liquid milk base, unlike ice cream, yogurt is not an oil-in-water emulsion. Rather, the custard-like consistency of yogurt results from acid coagulation of milk proteins following fermentation of sugars in the milk solution by lactic acid producing bacteria. More specifically, when yogurt is made, a milk solution is incubated with special bacteria that metabolize milk sugars, leaving lactic acid as a by-product. When the level of acidity of the resulting "fermenting" milk solution reaches about 0.6 percent (in terms of the lactic acid), further growth of the bacteria is inhibited and coagulation of the solids in the milk solution occurs. Knowing that the smooth, custard-like consistency of the yogurt results from acid induced coagulation of the milk solids, and is achieved before the yogurt is "frozen", it is not surprising that even low fat and non-fat yogurt can be used to make a frozen dessert having acceptable flavor, body and texture.

Unlike a yogurt, the milk solids in the non-fat dairy compositions of the present invention are not coagulated by the action of lactic acid producing bacteria, thereby giving body and texture to a frozen dessert made therefrom. (Additional body is often given to frozen yogurts by the addition of stabilizer ingredients such as sodium alginate. The alginate reacts with calcium in the yogurt, thereby producing an insoluble gel that provides an internal "skeleton" or network to support the frozen product.) In addition, unlike traditional ice creams, the non-fat dairy compositions of the present invention are not oil-in-water emulsions. In fact, they are essentially fat free. Therefore it is surprising that these non-fat non-yogurt dairy compositions can be used to produce soft and hard frozen dairy dessert products that have flavor, body and texture comparable to high quality, fat-containing ice creams.

As stated above, the present invention comprises non-fat dairy dessert compositions that can be used to make frozen dessert products having the flavor, body, and texture of ice cream. It has also been discovered that preparation of these non-fat dairy compositions requires a change in standard processing procedures in that a portion of the milk sugar in the milk solids is "caramelized" before the mix is used to make frozen dairy desserts.

The idea of caramelizing sugar is not new, nor is the idea of partially caramelizing milk sugars to make an improved yogurt. For example, to minimize the amount of sweetener that must be added to a yogurt to offset the natural tartness of the "lactic acid", U.S. Pat. No. 4,258,064 (issued Mar. 24, 1981 to T. S. Michener) teaches partial caramelization of the milk sugars prior to incubation of the dairy base mix with yogurt producing bacteria. Because the caramelized milk sugars are not fermented by the lactic acid producing bacteria, the resulting yogurt has a greater natural sweetness than conventional yogurts have.

While the idea of caramelizing milk sugars is not new, the idea that caramelized milk sugars and milk solids can be used to make non-fat, non-yogurt frozen dairy desserts is new. In addition, due to the lack of fat and therefore the inherent inability of a fat free base mix to form an oil-in-water "ice cream" type emulsion, it is surprising that the non-fat "caramelized" dairy compositions of the present invention can be used to make frozen dairy desserts that have body, texture and favor that is comparable to a good quality ice cream.

Definitions

Certain words and terms of art are referred to in the present specification and claims; these words and terms of art are expressly defined for use herein as follows:

As used herein, essentially fat free and non-fat are equivalent terms that are used interchangeably. Non-fat, as defined by law, means that the final product will contain a maximum of 0.5 percent milk fat. As used herein, essentially fat free also means that the final product will contain a maximum of 0.5 milk fat.

As used herein, caramelizing means the reaction that occurs when milk solids are heated in the presence of water and sugars (e.g., sucrose, inverts, glucose, and the like) and thereby develop a characteristic flavor (known as caramel flavor) due to the reaction between the milk protein and the reducing sugars.

Caramelizing is also known in the art as the browning reaction or the Maillard reaction since it was first noted by the French chemist, Maillard. The *Condensed Chemical Dictionary*, Tenth Edition, Van Nostrand Reinhold Company, New York, defines the Maillard or browning reaction as follows: A complicated and not completely evaluated sequence of chemical changes occurring without the involvement of enzymes during heat exposure of foods containing carbohydrates (usually sugars) and proteins. It begins with an aldol condensation reaction involving the carbonyl groups of proteins, and ends with formation of furfural, which produces the dark brown coloration. Besides color change, the reaction is accompanied by alterations in flavor and texture, as well as in nutritive value.

As used herein, the phrase "wherein at least a portion of the milk solids in the MSNF are caramelized" means that at least a portion of the MSNF in the composition have been heated to a temperature sufficient to cause caramelization of the milk sugars and milk proteins contained therein. A temperature sufficient to caramelize the milk solids will be in the range of 150° F. to 300° F., and preferably within the range of about 220° F. to about 270° F. The fact that heated milk sugars and milk proteins have been or are being caramelized can be recognized by the skilled artisan when a mixture containing the milk solids begins to develop the color and flavor characteristic of caramel or burnt sugar.

As used herein, pasteurizing means heat treatment of milk, fruit juices, canned meats, egg products, etc., for the purpose of killing or inactivating disease-causing organisms. For milk, the minimum exposure is 62° C. for 30 minutes, or 72° C. for 15 seconds, the latter being called flash pasteurization. Though this treatment kills all pathogenic bacteria and also inactivates enzymes which cause deterioration of the milk, the shelf-life is limited; to prolong storage life temperatures of 80° C. to 88° C. for 20 to 40 seconds must be used. Complete sterilization (q.v.) requires ultra high pasteurization at temperatures from 94° C. for 3 seconds to 150° C. for 1 second; in-can heating at 116° C. for 12 minutes and 130° C. for 3 minutes is also employed for maximum stability and long storage life.

As used herein, homogenization means a mechanical process for reducing the size of the fat particles of an emulsion (usually milk) to uniform size, thus creating a colloidal system that is unaffected by gravity. The original diameter of the fat particles (from 6 to 10 microns) is reduced to 1 to 2 microns, with an increase in total surface area of from four to six times. This is done by passing the milk through a homogenizer (or colloid mill), a machine having small channels, under a pressure of from 2000 to 2500 psi at a speed of about 700 feet a second. This operation not only brings about a permanently stable system, but also changes the properties of the milk in respect to taste, color, and the chemical nature of the protective coating on the fat particles. It also increases its sensitivity to light and its tendency to foam. The forces involved are shear, impingement, distention, and cavitation.

As used herein, standard holding temperature means 40° F. or less.

As used herein, MSNF means milk solids non-fat. The MSNF constituents include sugars, proteins and minerals. Milk is composed of water, milk fat and MSNF.

As used herein, invert sugar means a mixture of glucose and fructose that is obtained by the hydrolysis of sucrose.

As used herein, ice cream means the frozen dessert as defined by U.S. Government standards. The composition of ice cream varies in different markets and in different localities. The composition for good average ice cream is: fat, 12 percent; MSNF, 11 percent; sugar, 15 percent; stabilizer and emulsifier, 0.3 percent; and total solids (TS), 38.3 percent. The range in composition may be: fat, 8–20 percent; MSNF, 8–15 percent; sugar 13–20 percent; stabilizer-emulsifier, 0–0.7 percent; and TS, 36–43 percent. (W. S. Arbuckle, *Ice Cream*, Fourth Edition at page 1.)

As used herein, frozen yogurt means a cultured frozen product containing the same ingredients as ice cream. It contains not less than 3.25 percent milk fat and not less than 8.25 percent MSNF and has a titratable acidity of not less than 0.5 percent. Low-fat frozen yogurt contains not less than 0.5 percent or more than 2.0 percent milk fat. Non-fat frozen yogurt contains less than 0.5 percent milk fat. (W. S. Arbuckle, *Ice Cream*, Fourth Edition at page 3.) (Some so-called frozen yogurts are really ice creams that merely contain yogurt cultures; in these products, no significant fermentation of the milk sugars occurs since the base mixes are often frozen minutes after the cultures are added. In so-called frozen yogurts, the requisite "acidity" is obtained by the addition of acid to the final product. The use of the term frozen yogurt in the present specification does non include these "non-cultured" but still so-called frozen yogurt desserts.)

As used herein, F means Farenheit and C means Centigrade.

As used herein, all parts and percentages are by weight unless otherwise designated.

SUMMARY OF THE INVENTION

The present invention comprises caramelized, non-fat dairy dessert compositions having a total solids range of from about 9 percent to about 98 percent, the compositions consisting essentially of: (a) non-fat milk, 0–100 percent; (b) MSNF, 0–100 percent; (c) sweetener, 0–80 percent; (d) water or other liquid, 0–91 percent; (e) stabilizer, 0–2.5 percent; wherein the compositions contain at least 0.5 percent MSNF (which can be supplied by the non-fat milk or other products such as non-fat dry milk, buttermilk, whey, etc.), and wherein at least a portion of the milk solids in the MSNF are caramelized milk solids, having been heated to a temperature sufficient to caramelize at least some of the milk sugars and milk proteins contained therein. The caramelized, non-fat dairy compositions of the present invention can be used to make candy, pudding-like desserts, and especially frozen dairy desserts that have body, texture and flavor characteristic of good quality fat-containing ice cream.

The present invention also comprises a method for making the caramelized non-fat dairy dessert compositions of the present invention. According to the method, in the compositions that will contain at least 0.5 percent MSNF, at least some of the milk sugars and milk proteins in the MSNF are caramelized by heating the MSNF to a temperature sufficient to cause a desired degree of caramelization. This temperature will vary depending on several factors, including the composition of the "mix" (especially how much MSNF it contains), the operational characteristics of the heating and cooling equipment, and the processing techniques being utilized. According to the method of the invention, the "mix" can consist only of MSNF, or it can consist of MSNF in combination with any or all of the other ingredients utilized in the non-fat dairy compositions. In a preferred method for causing the essential caramelization, the "mix" is heated to a temperature of about 150° F. to about 300° F. for about 1 to about 15 minutes, until the "mix" develops the desired "caramel" color and flavor.

As those skilled in the art will appreciate, although the temperature and time required to achieve a desired degree of caramelization, characterized by a desired degree of caramel color and flavor are dependent on several factors, they can be determined by a skilled artisan without undue experimentation.

DETAILED DESCRIPTION OF THE INVENTION

The present invention is based on the surprising discovery that a non-fat dairy dessert having the taste, body and texture of a good quality ice cream can be obtained by using a dairy product base consisting essentially of non-fat milk, milk solids non-fat (e.g., non-fat dry milk), sweetener(s), stabilizers, and water, mixed in certain proportions and then frozen, as long as at least some of the MSNF in the composition have been heated to temperatures that are sufficient to cause partial "caramelization" of the milk sugars and proteins contained therein. According to the invention, the essential caramelization of the milk solids can be achieved in one of two ways: (1) by producing a separate caramelized MSNF-containing "premix" which is then added to a dairy product base, thereby imparting it with the requisite "caramelization", or (2) by heating a non-precaramelized MSNF-containing dairy product base to temperatures that are sufficient to cause partial caramelization of the MSNF contained therein.

The caramelized premix process requires the heating and "caramelization" of only part of the MSNF. A suitable premix can be prepared in two ways. According to the first way, MSNF is heated to temperatures sufficient to cause at least partial caramelization of the milk proteins and sugars contained therein. In this form, a "premix" comprised essentially only of MSNF is heated to temperatures sufficient to cause caramelization of at least some of the milk proteins and milk sugars contained therein. This is illustrated below by means of "Premix A". Alternatively, a "premix" comprised of MSNF in combination with some of the other ingredients of the dairy product base are heated to temperatures sufficient to cause at least partial caramelization of the milk proteins and sugars contained in the MSNF. This alternative precaramelized premix approach is illustrated below by means of "Premix B". According to the "Premix B" approach, a "premix" comprised of MSNF in combination with some of the other ingredients in the base dairy mix (e.g., sugar, corn sweetener and liquid) is heated to temperatures sufficient to cause caramelization of at least some of the MSNF contained therein.

According to the invention, regardless of whether the "premix" is comprised essentially only of MSNF, or of MSNF in combination with some of the other ingredients in the dairy product base, the "caramelized" premix is added to other ingredients to create a dairy product base wherein at least some of the MSNF milk proteins and milk sugars are caramelized.

With regard to the "Premix A" approach, the MSNF to be caramelized can be supplied by a liquid MSNF-containing product such as non-fat milk, or a dry one such as non-fat dry milk. If the MSNF is supplied by a product such as non-fat milk, in a preferred form, the water is essentially evaporated off before caramelization of the MSNF is made to occur. On the other hand, if the MSNF is supplied by a product such as non-fat dry milk (which is typically comprised of about 97 percent MSNF and about 3 percent water), a small amount of additional water may be added to the dry milk to give more control over the heating process required for the caramelization of the MSNF. Examples of Premix A recipes are given below.

1. Premix A Recipe #1
   Non-fat milk, 0–100 percent
   Dry non-fat milk, 0–100 percent
   Water, 0–91 percent
2. Premix A Recipe #2
   Non-fat milk, 100 percent
3. Premix A Recipe #3
   Non-fat dry milk, 100 percent
4. Premix A Recipe #4
   Non-fat dry milk, 90 percent
   Water, 10 percent Turning now to the "Premix B" approach, in preferred recipes, the MSNF will be mixed with a liquid such as non-fat milk or water, and sweeteners such as sugar and corn sweetener before the MSNF-containing mixture is heated to temperatures sufficient to caramelize at least some of the milk proteins and milk sugars contained therein. However, as those skilled in the art will appreciate, in other instances, the MSNF could be mixed with various other combinations of the ingredients that will comprise the final base dairy mix. Examples of Premix B recipes are given below.

1. Premix B Recipe #1
   Non-fat milk, 0–95 percent
   Dry non-fat milk, 0–95 percent
   Sugar, 0–99.5 percent
   Corn sweetener, 0–99.5 percent
   Water or other liquid, 0–99 percent
2. Premix B Recipe #2
   Dry non-fat milk, 20–30 percent
   Sugar, 20–30 percent
   corn sweetener, 20–30 percent
   Water or other liquid, 20–30 percent
3. Premix B Recipe #3
   Dry non-fat milk, 25 percent
   Sugar, 25 percent
   Corn sweetener, 25 percent
   Water, 25 percent In preparing any of the Premixes of the invention, the ingredients are thoroughly mixed until well dissolved. The mixture is then heated, preferably while being continually stirred, until the temperature reaches a range of about 150° F. to about 300° F. (preferably about 220° F. to about 270° F.) until the desired degree of caramelization, characterized by a darker color and richer flavor, is achieved. The non-fat Premix is then cooled for use at a later time or added to other ingredients in a dairy dessert base mix.

The actual level of caramelization in the premix will dictate the amount of premix that should be added to a dairy dessert base mix to achieve, for example, desired ice cream characteristics in a frozen dairy dessert. Lower levels of caramelization of the premix would require higher percentages of premix in the non-fat frozen dessert whereas higher levels of caramelization would require lower percentages of the premix. In preferred forms, the premix will comprise about 1 to about 25 percent of the final dairy dessert base mix.

In preparing the non-fat dairy dessert compositions of the present invention, the "desired" degree of caramelization will be determined subjectively. The degree of "caramelization" in the following "Caramelization Comparison Formula" illustration, which adds pre-caramelized Premix B Receipe #3 to other ingredients to make the final dairy base mix, is meant to provide relative caramel color and caramel flavor standards against which the "desired" degree of caramelization in other mixtures and processing techniques can be compared.

Caramelization Comparison Formula

| Ingredients | Formula g/kilogram |
| --- | --- |
| Non-fat milk | 778 |
| Caramelized non-fat premix B#3 | 53 |
| Stabilizer | |
| cellulose gum, pectin, carageenan | 6 |
| Sugar | 93 |
| Corn sweetener | 70 |
| | 1000 |

Total solids 28.5% ± 1.0%
Milk solids 12.2% ± 0.2%

The caramelization comparison formula mixture was mixed, pasteurized, cooled and then frozen in a standard machine designed to freeze ice cream. The final product was an aerated product having good body, a soft consistency, a cream color, and a delicious flavor.

As stated above, use of a caramelized premix is one of two ways in which caramelized MSNF can be incorporated into the final dairy base mix. According to the second or "non-premix" method, a non-precaramelized MSNF-containing dairy product base is heated to temperatures sufficient to cause a desired degree of caramelization of the MSNF contained therein. This "non-premix" method is illustrated below:

Non-premix Formula Illustration

| Ingredients | Formula g/kilogram |
| --- | --- |
| Non-fat milk | 778 |
| Non-fat dry milk | 53 |
| Stabilizer | |
| cellulose gum, pectin, carageenan | 6 |
| Sugar | 93 |
| Corn sweetener | 70 |
| | 1000 |

Total solids 28.5% ± 1.0%
Milk solids 12.2% ± 0.2%

The ingredients in the non-premix illustration formula were thoroughly combined and heated until all ingredients were combined. The mixture was stirred continuously. When the temperature reached about 165° F.–185° F., the mixture was cooled, then frozen in a standard machine designed to freeze ice cream. The final product was an aerated product having good body, a soft consistency, a cream color, and a delicious flavor.

Turning now to general aspects that relate to the invention as a whole, in producing preferred, caramelized, non-fat dairy compositions of the present invention, the various MSNF-containing mixtures are thoroughly combined and then heated to a temperature of about 150° F.–300° F. to partially "caramelize" some of the milk solids contained therein. Preferably, the temperature of "mixture" will be about 165° F. to about 185° F. However, as those skilled in the art of cooked dairy desserts will appreciate, the temperature of those portions of the mixture that ware in direct contact with the heating source will be higher than 185° F.; this temperature is preferably between about 220° F. and 270° F., and most preferably between about 225° F. and 265° F. Caramelization of the milk sugars and solids occurs especially well within this higher temperature range. After maintaining the mixture within the above temperature range for a duration of 1 to 15 minutes, depending on temperature and the degree of caramelization desired, the mixture is cooled. Since the compositions of the present invention are essentially fat-free, homogenization of the mixtures is not necessary.

The method of non-fat dairy mixture preparation described above requires that a portion of the mixture be allowed to remain in contact with a heated surface until the temperature of that portion of the mix exceeds 185° F. (preferably 220° F. to 270° F.) so that caramelization of the sugar solids in that portion of the mix occurs. Swept surface heating and cooling equipment is able to achieve this requirement with excellent controllability as are many other forms of commercial heating and cooling equipment.

With regard to caramelization, intensity of the characteristic "caramel" color and flavor change is directly proportional to the amount of MSNF in the composition being heated. In other words, the more MSNF the composition contains, the more apparent the brown color change will be as caramelization occurs. A composition that contains only MSNF will have the dark brown color characteristic of burnt sugar if it is allowed to fully caramelize. If on the other hand the composition contains ingredients other than MSNF, the color change due to the caramelization will vary from "cream" to amber to dark brown, again depending on how much MSNF is present and how long the composition is maintained at the "caramelizing" temperatures. Again, the Caramelization Standardization Formula given above provides relative standards against which degrees of caramelization can be compared.

The non-fat dairy dessert compositions of the present invention can be readily prepared using as the base dairy product any conventional non-fat dried milk of sufficient purity and composition in combination with water, sweeteners, stabilizer, and the proper proportion of caramelized non-fat milk solids. Standard ice cream mix equipment, including standard heating and cooling equipment can be used to carry out the method of the invention.

In the recipes given herein, all percents are percents by weight based on the total weight of the composition. In the compositions, non-fat milk may be replaced by water. Sugar may be replaced by corn sweetener or other forms of sweeteners.

Milk solids non-fat products useful in the compositions of the present invention can be supplied by non-fat milk, non-fat dry milk, condensed skim milk, dried whey, buttermilk, milk solids components, and the like.

Sweeteners useful in the compositions of the present invention include, but are not limited to, beet sugar, cane sugar, fruit juice, concentrated fruit juice, corn sweeteners, maple sugar, lactose, fructose, artificial sweeteners, and the like.

Stabilizers useful in the compositions of the present invention include, but are not limited to, cellulose gum, guar gum, pectin gum, xanthan gum, locust bean gum, carageenan, alginates and the like.

While the non-fat dairy dessert compositions of the present invention can be used without additional flavorings, those skilled in the art will appreciate that cocoa, carob, spices colors, plus a variety fruits, nuts, candies, and flavorings can be added to the compositions. In this regard, natural or artificial flavors representative of caramel or burnt sugar flavor can be added to enhance the caramel flavor of the caramelized milk proteins and sugars. Even yogurt cultures and some lactic acid like flavorings can also be added to produce non-cultured "pseudo" frozen yogurt desserts.

Stabilizers can and are preferably used in the present invention to give better body and texture, and to improve stability of overrun and melt down to the overall mixture. The stabilizers are preferably derived from natural sources such as plants and the like, although some of the stabilizers may have been modified in order to render them stable and food-grade functional or clean. Examples of preferred stabilizers which can be utilized in the present invention include cellulose gum, pectin gum, and carageenan. In addition to these basic types of stabilizers, other types can be utilized such as various alginates which are generally made from seaweed, various modified cellulose gums, xanthan gum, various pectins, and the like. The stabilizers render the non-fat dairy mix more uniform and also tend to control the size of ice crystals and the consistency of the mix when frozen. That is, a creamy consistency is generally obtained.

The total amount of all stabilizers utilized is generally from about 0.05 percent to about 2.5 percent by weight based upon the weight of the entire non-fat dairy mix. Lesser amounts tend to result in separation of the various ingredients whereas higher amounts tend to result in a very viscous mixture which is difficult to mix and freeze. A more desirable range is from about 0.05 percent to about 1.5 percent by weight with approximately 0.15 percent to about 0.80 percent being preferred. Generally, the total amount of stabilizer utilized remains the same. Thus, if the amount of an individual stabilizer utilized is reduced, it is usually compensated for by the use of a similar increase in the amount of another stabilizer so that the overall amount remains the same.

Frozen dairy desserts made from the non-fat dairy dessert compositions of the present invention will preferably have a freezing range of about 0° F. to 30° F. (with the most preferred range being 15° F. to 25° F.). In addition, these frozen dairy desserts will also preferably have at least 30 percent overrun.

The invention will be better understood by reference to the following representative and illustrative examples where all parts and percentages are by weight unless otherwise designated. The examples are included for purposes of illustration only and should not viewed as limiting the appended claims in any way.

Mixing Procedure

Some of the following examples refer to a mixing procedure which consists essentially of: Heating the mixture with continual stirring until the temperature reaches a range of about 150° F. to about 300° F. (preferably about 220° F. to about 270° F. at the point of contact with the heated surface), and maintaining the mixture within that temperature range until a desired degree of caramelization, characterized the desired color and flavor, is achieved.

EXAMPLE 1

A non-fat dairy dessert mixture was made having the following formulation:

| Ingredients | Formula g/kilogram |
|---|---|
| Non-fat milk | 778 |
| Caramelized non-fat premix B#3 | 53 |
| Stabilizer | |
| cellulose gum, pectin, carageenan | 6 |
| Sugar | 93 |
| Corn sweetener | 70 |
| | 1000 |

Total solids 28.5% ± 1.0%
Milk solids 12.2% ± 0.2%

The mixture was mixed, pasteurized, cooled and then frozen in a standard machine designed to freeze ice cream. The final product was an aerated product having good body, a soft consistency, a cream color, and a delicious flavor.

EXAMPLE 2

A non-fat dairy dessert mixture was made utilizing the above described mixing procedure; the mixture had the following formulation:

| Ingredients | Formula g/kilogram |
|---|---|
| Non-fat milk | 778 |
| Non-fat dry milk | 53 |
| Stabilizer | |
| cellulose gum, pectin, carageenan | 6 |
| Sugar | 88 |
| Caramel flavor | 5 |
| Corn sweetener | 70 |
| | 1000 |

Total solids 28.5% ± 1.0%
Milk solids 12.2% ± 0.2%

The mixture was pasteurized, cooled and then frozen in a standard machine designed to freeze ice cream. The final product was an aerated product having good body, a cream color, a soft consistency and a delicious flavor.

EXAMPLE 3

A non-fat dairy dessert mixture was made utilizing the above described mixing procedure; the mixture had the following formulation:

| Ingredients | Formula g/kilogram |
|---|---|
| Non-fat milk | 778 |
| Non-fat dry milk | 53 |
| Stabilizer | |
| cellulose gum, pectin, carageenan | 6 |
| Sugar | 93 |
| Corn sweetener | 70 |
| | 1000 |

Total solids 28.5% ± 1.0%
Milk solids 12.2% ± 0.2%

The mixture was pasteurized, cooled and then frozen in a standard machine designed to freeze ice cream. The final product was an aerated product having good body, a cream color, a soft consistency and a delicious flavor.

EXAMPLE 4

A non-fat dairy confection was made having the following formulation:

| Ingredients | Formula g/kilogram |
| --- | --- |
| Non-fat dry milk | 170 |
| Sugar | 500 |
| Corn sweetener | 120 |
| Water or non-fat milk | 210 |
| | 1000 |

The confection was mixed, heated until partial caramelization of the various sugars had occurred, and then poured into lollipop molds. The resulting lollipops had the flavor and color characteristic of the candy known as "Sugar Daddies".

EXAMPLE 5

A non-fat pudding was made having the following formulation:

| Ingredients | Formula g/kilogram |
| --- | --- |
| Non-fat milk | 748 |
| Caramelized non-fat premix B#3 | 53 |
| Stabilizer cellulose gum, pectin, carageenan | 6 |
| Sugar | 93 |
| Corn sweetener | 70 |
| Modified food starch | 30 |
| | 1000 |

The mixture was mixed, pasteurized, and cooled. The final product was a pudding having good body, a soft consistency, a cream color, and a delicious flavor.

EXAMPLE 6

A non-fat dairy drink is made having the following formulation:

| Ingredients | Formula g/kilogram |
| --- | --- |
| Non-fat milk | 930 |
| Premix B#3 | 53 |
| Stabilizer cellulose gum, pectin, carageenan | 2 |
| Sugar | 8 |
| Corn sweetener | 7 |
| | 1000 |

The mixture was pasteurized and cooled. The final product is a dairy drink having good body, a cream color, a soft consistency and a delicious flavor.

SPECIFICATION SUMMARY

From the foregoing description, one of ordinary skill in the art can understand that the present invention comprises non-yogurt non-fat dairy compositions that contain at least some caramelized milk solids. The compositions can be used to make non-fat confections, puddings, drinks, and especially frozen dairy desserts that have the body, texture and flavor characteristic of a good quality fat-containing ice cream.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. A caramelized non-fat dairy dessert composition having a total solids range of from about 9 percent to about 98 percent, said composition consisting essentially of: (a) non-fat milk, 0–100 percent; (b) milk solids non-fat, 0–100 percent; (c) sweetener, 0–80 percent; (d) liquid selected from the group consisting of water and fruit juice, 0–91 percent; and (e) stabilizer, 0–2.5 percent; wherein said percents are percents by weight based upon the total weight of said composition; and wherein the compositions contain at least 0.5 percent MSNF, and wherein at least a portion of the milk solids in the MSNF are caramelized milk solids.

2. A caramelized non-fat dairy dessert composition according to claim 1 wherein said composition is pasteurized and then frozen until it has an ice cream like consistency.

3. A caramelized non-fat dairy dessert composition according to claim 1 wherein said milk solids non-fat are selected from the group consisting of condensed skim milk, non-fat dry milk, dried whey and buttermilk.

4. A caramelized non-fat dairy dessert composition according to claim 1 wherein said sweetener is selected from the group consisting of cane sugar, beet sugar, fruits, fruit juice, concentrated fruit juice, corn sweeteners, maple sugar, lactose and fructose.

5. A caramelized non-fat dairy dessert composition according to claim 1 wherein said stabilizer is selected from the group consisting of guar gum, locust bean gum, xanthan gum, carageenan, alginate, cellulose gum and pectin.

6. A caramelized non-fat dairy premix composition, said composition consisting essentially of: (a) non-fat milk, 0–100 percent; (b) non-fat dry milk, 0–100 percent; and (c) water or other liquid, 0–91 percent; wherein said percents are percents by weight based upon the total weight of said composition; and wherein the compositions contain at least 0.5 percent MSNF, and wherein at least a portion of the milk solids in the MSNF are caramelized milk solids.

7. A caramelized non-fat dairy premix composition consisting essentially of non-fat dry milk 100 percent.

8. A caramelized non-fat dairy premix composition consisting essentially of (a) non-fat dry milk, 90–99 percent and (b) water, 1–10 percent.

9. A caramelized non-fat dairy dessert premix composition consisting essentially of: (a) non-fat milk, 0–95 percent; (b) dry non-fat milk, 0–95 percent; and (c) sugar, 0–99.9 percent, (d) corn sweetener, 0–99.5 percent, and (e) liquid selected from the group consisting of water and fruit juice, 0–99 percent; wherein said percents are percents by weight based upon the total weight of said premix composition; and wherein at least a portion of the non-fat milk solids are caramelized milk solids.

10. A caramelized non-fat dairy dessert premix composition consisting essentially of: (a) milk solids non-fat, 20–30 percent; (b) sugar, 20–30 percent; (c) corn sweetener, 20–30 percent; and (d) liquid selected from the group consisting of water, fruit juice and non-fat milk, 20–30 percent; wherein said percents are percents by weight based upon the total weight of said premix composition; and wherein at least a portion of the milk solids in said premix composition are caramelized milk solids.

11. A caramelized non-fat dairy dessert premix composition consisting essentially of: (a) non-fat dry milk, 25 percent; (b) sugar, 25 percent; (c) corn sweetener, 25 percent, and (d) liquid selected from the group consisting of water, fruit juice and non-fat milk, 25 percent; wherein said percents are percents by weight based upon the total weight of said premix composition; and wherein at least a portion of the milk solids in said non-fat dry milk are caramelized milk solids.

12. A caramelized non-fat dairy dessert composition consisting essentially of: (a) non-fat milk, about 77.8 percent; (b) a caramelized non-fat dairy desert premix according to any of claims 9-11, about 5.3 percent; (c) stabilizer, about 0.6 percent; (d) sugar, about 9.3 percent; and (e) corn sweetener, about 7.0 percent; wherein said percents are percents by weight based upon the total weight of said composition; and wherein said composition is mixed, pasteurized and then frozen until it has an ice cream like consistency.

13. A caramelized non-fat dairy pudding composition consisting essentially of: (a) non-fat milk, about 77.8 percent; (b) a caramelized non-fat dairy desert premix according to any of claims 9-11, about 5.3 percent; (c) stabilizer, about 0.6 percent; (d) sugar, about 9.3 percent; (e) corn sweetener, about 7.0 percent; and (f) modified food starch, about 3 percent; wherein said percents are percents by weight based upon the total weight of said composition; and wherein said composition is mixed, pasteurized and then cooled.

14. A caramelized non-fat dairy drink composition consisting essentially of: (a) non-fat milk, about 93 percent; (b9 a caramelized non-fat dairy desert premix according to any of claims 9-11, about 5.3 percent; (c) stabilizer, about 0.2 percent; (d) sugar, about 0.8 percent; and (e) corn sweetener, about 0.7 percent; wherein said percents are percents by weight based upon the total weight of said composition; and wherein said composition is mixed, pasteurized and then cooled.

15. A dairy confection consisting essentially of (a) non-fat dry milk, about 17 percent; (b) sugar, about 50 percent; (c) corn sweetener, about 12 percent; and (d) liquid selected from the group consisting of water, non-fat milk and fruit juice, about 21 percent; wherein said confection has been heated to a temperature sufficient to cause partial caramelization of the milk solids and sugars has occurred.

* * * * *

UNITED STATES PATENT AND TRADEMARK OFFICE
CERTIFICATE OF CORRECTION

PATENT NO. : 4,874,627
DATED : October 17, 1989
INVENTOR(S) : Donald G. Greig and Edward L. Bonneau, III It is certified that error appears in the above-identified patent and that said Letters Patent is hereby corrected as shown below:

On the title page,
    Assignee's name should read --Nouvelle Ice Cream Corporation-- rather than "Nouevelle Ice Cream Corporation".

Column 1, line 38, delete "successufl" and insert therefor --successful--.

Column 2, line 44, delete "favor" and insert therefor --flavor--.

Column 7, line 67, delete "ware" and insert therefor --are--.

Column 9, line 1, after "variety", insert --of--; after "spices", insert --,--.

Column 9, line 63, after "characterized", insert --by--.

Column 14, line 7, delete "(b9" and insert therefor --(b)--.

Column 14, line 11, after "percents" insert --are percents--.

Signed and Sealed this

Thirtieth Day of October, 1990

Attest:

HARRY F. MANBECK, JR.

*Attesting Officer*      *Commissioner of Patents and Trademarks*